Oct. 3, 1961 G. W. SMITH, JR 3,003,111

PULSE GENERATOR HAVING MEANS FOR INDEPENDENTLY CONTROLLING, DURING SUCCESSIVE OUTPUT PERIODS, AMPLITUDE OR SLOPE AND DURATION

Filed May 29, 1958 6 Sheets-Sheet 1

INVENTOR
G. W. SMITH, JR.
BY Walter M. Hill
ATTORNEY

INVENTOR
G. W. SMITH, JR.
BY Walter M. Hill
ATTORNEY

INVENTOR
G. W. SMITH, JR.
BY Walter M. Hill
ATTORNEY

INVENTOR
G. W. SMITH JR.
BY Walter M. Hill
ATTORNEY

Oct. 3, 1961 G. W. SMITH, JR 3,003,111

PULSE GENERATOR HAVING MEANS FOR INDEPENDENTLY CONTROLLING, DURING SUCCESSIVE OUTPUT PERIODS, AMPLITUDE OR SLOPE AND DURATION

Filed May 29, 1958 6 Sheets-Sheet 5

INVENTOR
G. W. SMITH, JR.
BY Walter M. Hill
ATTORNEY

INVENTOR
G. W. SMITH, JR.
BY Walter M. Hill
ATTORNEY

United States Patent Office 3,003,111

Patented Oct. 3, 1961

3,003,111

PULSE GENERATOR HAVING MEANS FOR INDEPENDENTLY CONTROLLING, DURING SUCCESSIVE OUTPUT PERIODS, AMPLITUDE OR SLOPE AND DURATION

George W. Smith, Jr., Morristown, N.J., assignor to Bell Telephone Laboratories, Incorporated, New York, N.Y., a corporation of New York

Filed May 29, 1958, Ser. No. 738,894

11 Claims. (Cl. 328—185)

This invention relates to non-sinusoidal wave generators, and more particularly to generators for producing pulses of rectangular and sawtooth forms.

In the electrical art, it is often necessary to obtain a repetitive pulse pattern of predetermined configuration. For example, in the field of pulse code modulation a repetitive pattern of rectangular pulses is useful in checking the response characteristics of telemetering equipment prior to its being put into service. And in the field of radar, a repetitive sawtooth pulse pattern is frequently generated and used to simulate, on the radar display, the radar sweep pattern. The function to be performed generally dictates the characteristics of the pattern and thus a rectangular or sawtooth pulse pattern may be needed wherein the amplitude, duration and/or spacing of the pulses vary in some selected manner. Similarly, in some cases, it may be desirable to obtain a plurality of sawtooth pulses wherein the slopes thereof are altered in some fashion.

To provide any given pulse pattern a specific circuit can be designed to produce the same. This, in most cases, involves nothing more than the application of engineering principles. Such an approach, however, while providing the wanted pattern, may prove to be extremely expensive for two reasons. First, of course, a separately designed circuit is needed for each pattern and, second, any subsequently desired alteration in the pattern may necessitate substantial modification of the circuit or alternatively development of a new circuit.

It is therefore a primary object of the present invention to provide a circuit for generating a wide variety of repetitive, rectangular and sawtooth pulse patterns.

A related object of the present invention is to generate a repetitive sawtooth pulse pattern wherein the slope, amplitude, duration, polarity and/or time spacing of the pulses may be readily varied.

A further related object is to generate a repetitive rectangular pulse pattern wherein the amplitude, duration, polarity and/or time spacing of the pulses may likewise be readily varied.

In accordance with the present invention, a sawtooth sweep voltage is initiated in a sweep generator circuit and this is compared with a preselected direct current voltage derived from a beam stepping tube circuit. The sweep voltage rises until its magnitude reaches a value equal to the said preselected voltage, at which time it is terminated. This termination of the sweep is accompanied by an advance of the beam of the beam stepping tube to the next target position. A new direct current voltage is produced for this next position of the beam and it in turn is compared to a new sweep voltage which is initiated in the sweep generator circuit a predetermined time after the termination of the previous sweep. The aforementioned comparison again results in termination of the sweep voltage when it reaches a magnitude equal to the new direct current voltage, and thus the cycle is repeated.

Separate potentiometers coupled to the respective targets of the beam stepping tube determine the amplitudes of the direct current voltages derived therefrom for each position of the beam. Accordingly, since these derived voltages in turn limit the successive sweep amplitudes, the successively generated sweep voltages can be amplitude modulated in any desired fashion.

The amplitude modulated, sawtooth pulse pattern thus far described is, in and of itself, of substantial utility. However, it is within the contemplation of the present invention to provide pulse patterns of even greater versatility. To this end, additional potentiometers are coupled to respective targets of the beam stepping tube in parallel with the first mentioned potentiometers. These additional potentiometers are used in like manner to provide direct current voltages of variable amplitude and thus, since the amplitudes thereof may be varied by potentiometer adjustment from zero potential to some maximum value, a rectangular pulse pattern of any selected configuration can be obtained therefrom. The said additional potentiometers control pulse amplitude, while the first mentioned potentiometers control pulse duration and time spacing. In this last regard, the time that the beam of the beam stepping tube remains in any one position is determined by the time it takes the sawtooth sweep voltage to reach the amplitude of the said preselected direct current voltage and, assuming a constant rate of rise, this is directly determined by the value set for this direct current voltage.

According to a further development of the invention, the rectangular pulse pattern, just described, is applied to an integrating amplifier sweep generator to produce a second sawtooth pulse pattern. The slope (rate of rise) of each sawtooth pulse is determined by the amplitude of the input rectangular pulse producing it, while the time duration and spacing of the sawtooth pulse pattern corresponds to that of the input rectangular pulse pattern. The amplitude of each sawtooth pulse will, of course, depend upon its slope as well as its time duration.

The nature of the invention and its various features, objects and advantages will be more fully understood from a consideration of the following description taken in connection with the accompanying drawings in which:

FIG. 1 is a block diagram showing the constituent elements of a pulse generator in accordance with the present invention;

FIGS. 2, 3 and 4, when arranged as shown in FIG. 5, show the detailed circuit diagram of the pulse generator system of FIG. 1;

FIG. 5 shows the manner in which

Figure 1:
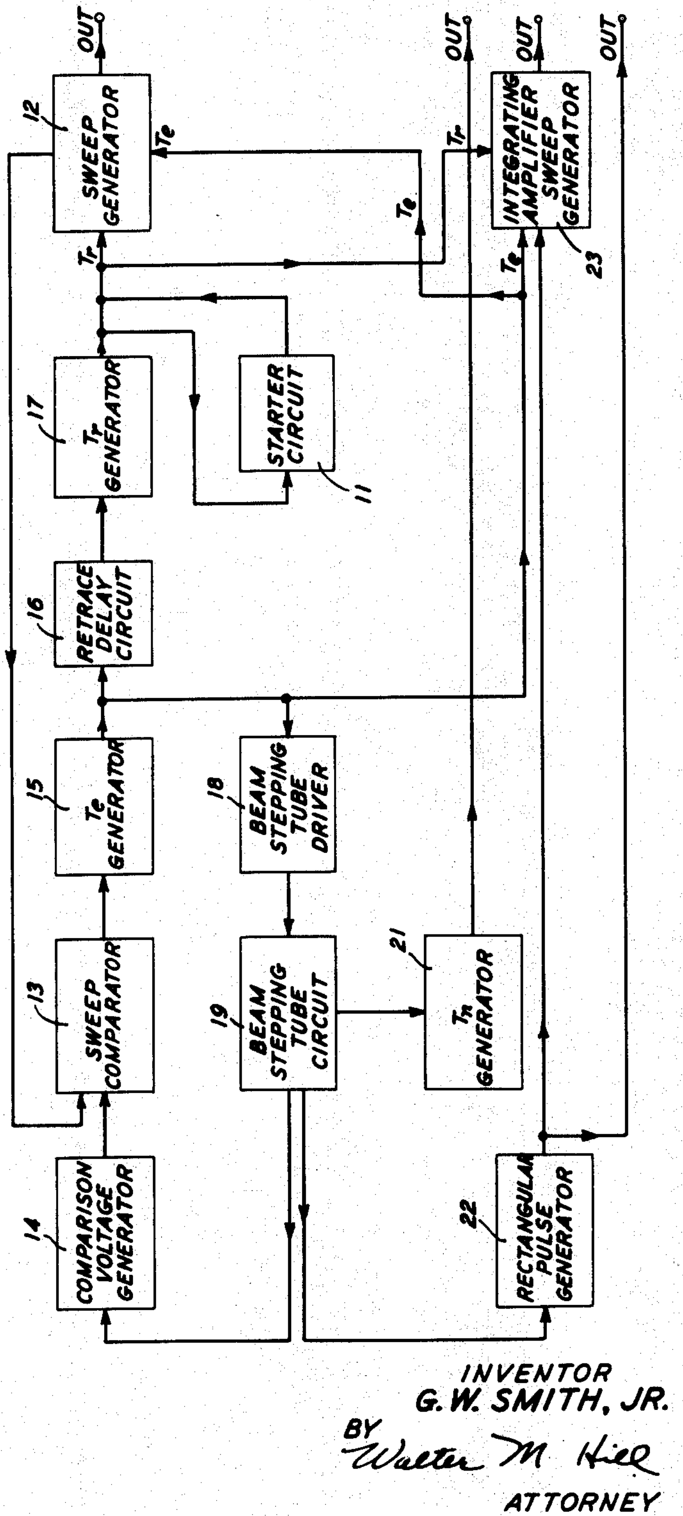

Referring more specifically to the drawings, there is shown in FIG. 1 a block diagram of a pulse generator system in accordance with the present invention. Since the system, in part, is essentially a ring circuit, there must be a pulse to start the chain of events. To this end, starter circuit 11, comprising a free-running multivibrator, delivers a short duration pulse to the sweep generator 12 to initiate a sawtooth sweep voltage therein. The period of the free-running multivibrator is adjusted so that after the first starter pulse, the starter circuit 11 has no further effect on the operation of the system.

The sweep voltage output of the sweep generator 12 is fed to the sweep comparator 13 where it is compared to a negative direct current voltage from the comparison voltage generator 14. The sweep voltage continues to rise in amplitude until it reaches a value equal to this negative direct current voltage, at which time the sweep comparator 13 produces a pulse which is regenerated in $T_e$ generator 15 and then delivered to the sweep generator 12 to end the sweep instantly. At this time two additional circuits are actuated, simultaneously, in response to this $T_e$ pulse.

The retrace delay circuit 16 is rendered operative by the $T_e$ trigger pulse and after a predetermined period of delay, sufficient to permit recovery of the sweep generator 12, a pulse output from the retrace delay circuit is delivered to $T_r$ generator 17 where it is regenerated and then fed to the sweep generator to start the next sweep. The $T_e$ pulse also triggers the beam stepping tube driver 18 which causes the beam of a beam stepping tube to step or advance to the next position.

The beam stepping tube circuit 19 comprises one or more beam stepping tubes of conventional design. In the circuit to be described two such tubes are connected in tandem so as to function in the same manner as a single tube. Now at the time the first starter pulse is sent to the sweep generator 12, the beam of the beam stepping tube comes to rest on one of the target output circuits. As previously indicated, by means of potentiometer control the voltage obtained from each target output circuit can be varied. Therefore, at the time the first sawtooth sweep voltage is being generated in sweep generator 12, a voltage proportional to the desired peak amplitude of the sweep is being generated in the beam stepping tube circuit 19. This voltage, while proportional to the desired peak amplitude, is not yet modified by the proper scale factor or adjusted to the proper reference voltage. This is the function of the comparison voltage generator 14 which operates in response to the output of the beam stepping tube circuit to provide a negative direct current voltage equal in magnitude to the desired sawtooth sweep amplitude.

When the beam of the beam stepping tube is stepped or advanced to the next target position, a new, negative direct current voltage is derived whose amplitude is controlled by the potentiometer associated with this next target. The new direct current voltage is compared in the sweep comparator 13 with the next sawtooth sweep and this again results in the termination of the latter, the initiation of a third sawtooth sweep after a predetermined delay, and the advance of the beam of the beam stepping tube to the next successive position. This process continues over and over again causing the beam of the beam stepping tube circuit to be stepped to each target position in succession. Thus a sawtooth pulse pattern can be obtained from the sweep generator 12 and the number of individually controlled, amplitude modulated, sawtooth pulses in the pattern will be equal to the number of target positions in the beam stepping tube circuit (the pair of tandem connected tubes used herein provide a pattern of eighteen such pulses). The pulse pattern is repetitively produced until one or more of the target associated potentiometers is varied, at which time a new pattern is produced.

The $T_n$ generator 21 is coupled to one of the target output circuits of the beam stepping tube circuit, preferably the last one in the beam stepping sequence. Each time the beam reaches the selected target a pulse is taken from the output circuit and regenerated in the $T_n$ generator. This $T_n$ pulse will occur once per pulse pattern, preferably at the completion thereof, and hence it can be used for synchronization of oscilloscopes or other equipment to which the pulse generator system may be connected.

As will be described in greater detail below, additional output circuits, comprising individual potentiometer means, are coupled to the respective targets of the beam stepping tube circuit in parallel with the first-mentioned target output circuits. A direct current voltage is thus likewise derived from each of these additional output circuits when the beam impinges upon the associated target. The amplitudes of the successively derived direct current voltages can be varied by potentiometer adjustment from zero potential to some maximum value. Accordingly, a rectangular pulse pattern of any selected configuration can be derived therefrom by adjusting the various potentiometers to provide direct current voltages only during the desired pulse periods (the potential being zero at all other times). The amplitudes of the desired rectangular pulses can be set by the potentiometers connected in the said additional output circuits, while the first-mentioned potentiometers control pulse duration and time spacing inasmuch as they determine the time that the beam of the beam stepping tube remains at each target position.

The additional or ancillary target output circuits are coupled in parallel to the rectangular pulse generator 22, the latter serving much the same function as comparison voltage generator 14. The pulse generator 22 further comprises, in part, an inverting amplifier so that the regenerated pulse pattern derived therefrom will, in most cases, be of positive polarity. However, means are provided in connection with generator 22 for controlling the individual pulse polarity, whereby a pattern of positive and negative pulses can be obtained. This feature will be described in detail later.

The rectangular pulse pattern produced in rectangular pulse generator 22 is fed to the integrating amplifier sweep generator 23 along with the $T_r$ and $T_e$ trigger pulses from the $T_r$ and $T_e$ generators. The generator 23 functions as an integrator to produce a sawtooth sweep voltage output in response to a rectangular-wave voltage input, the slope or rate of rise of the sweep being a function of the amplitude of the input voltage. The $T_r$ and $T_e$ pulses are used to perform a switching operation, that is the $T_r$ pulses initiate generator operation while the $T_e$ pulses terminate it. However, whether a sweep is in fact produced in response to an input $T_r$ pulse depends upon the presence of an input rectangular-wave voltage from pulse generator 22. The amplitude that each sawtooth pulse reaches is a function of its slope and time duration.

Figure 5:
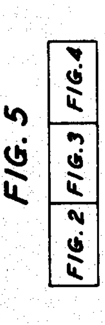
Figure 2:
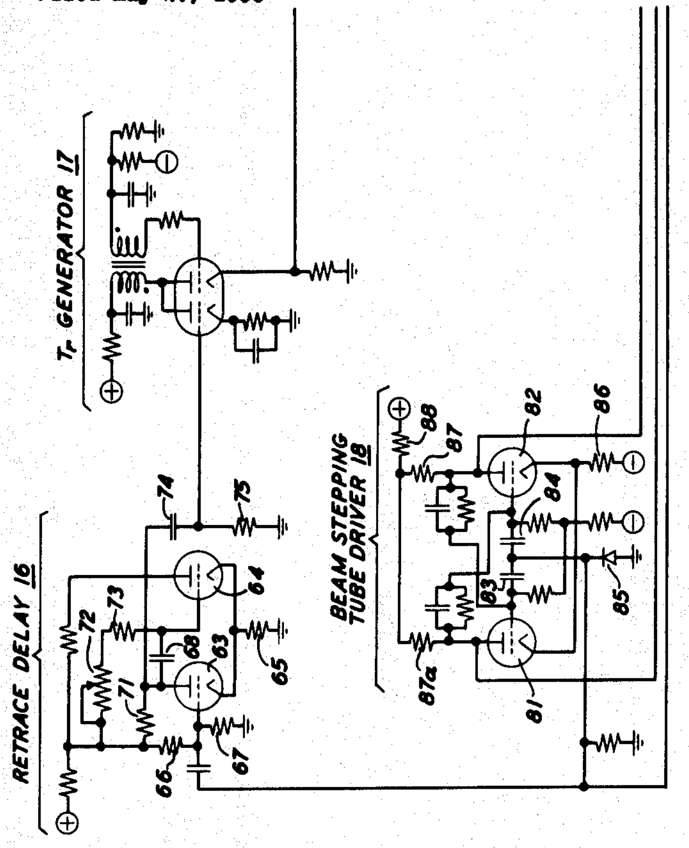
FIGS. 2, 3 and 4 are to be positioned adjacent one another.
Figure 4A:
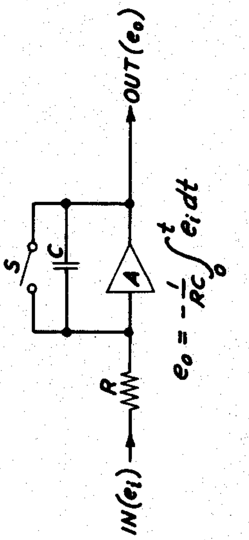
FIG. 4A is a diagram useful in the explanation of the operation of the integrating amplifier sweep generator circuit shown in FIG. 4.
Figure 3:
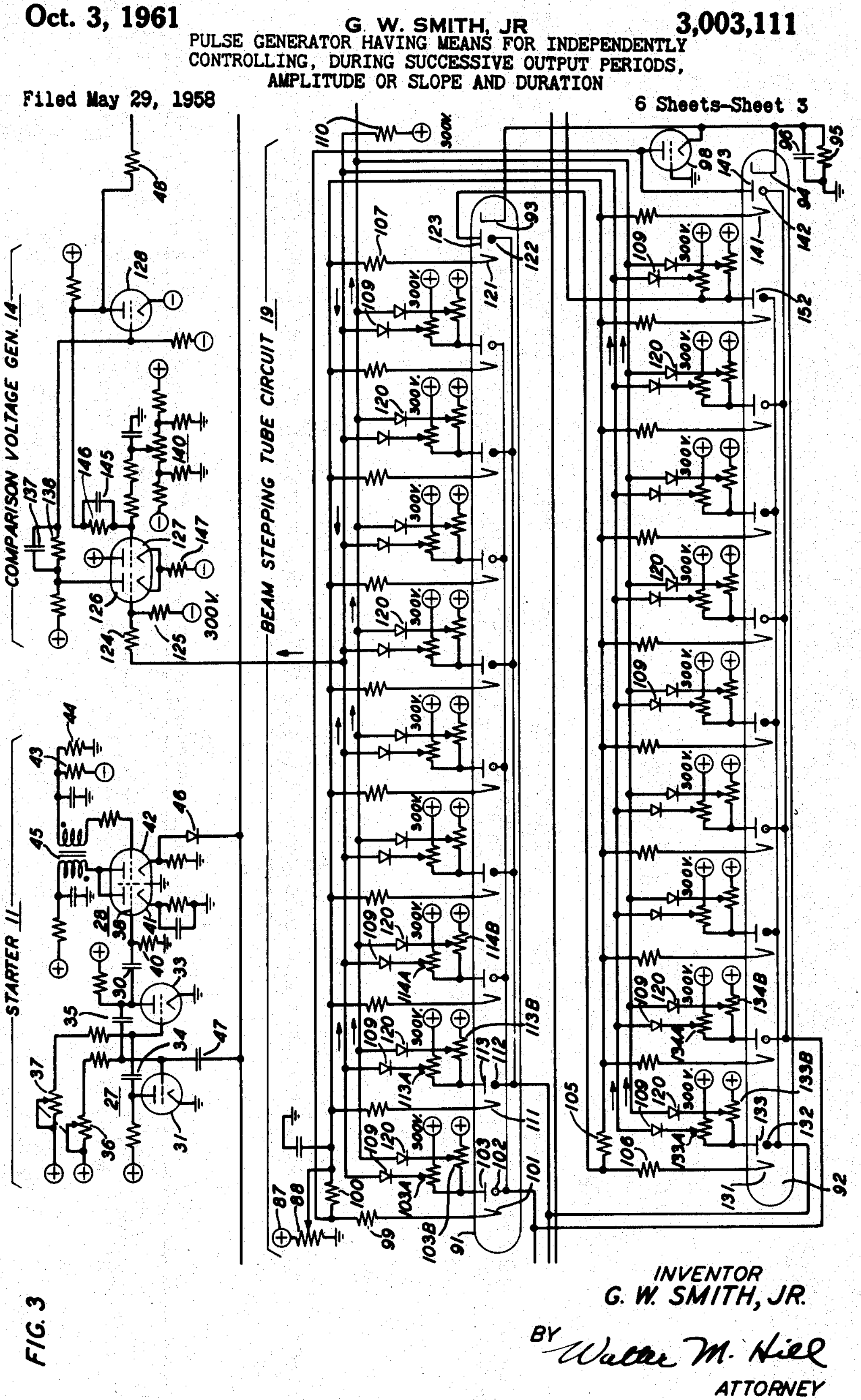
Figure 4:
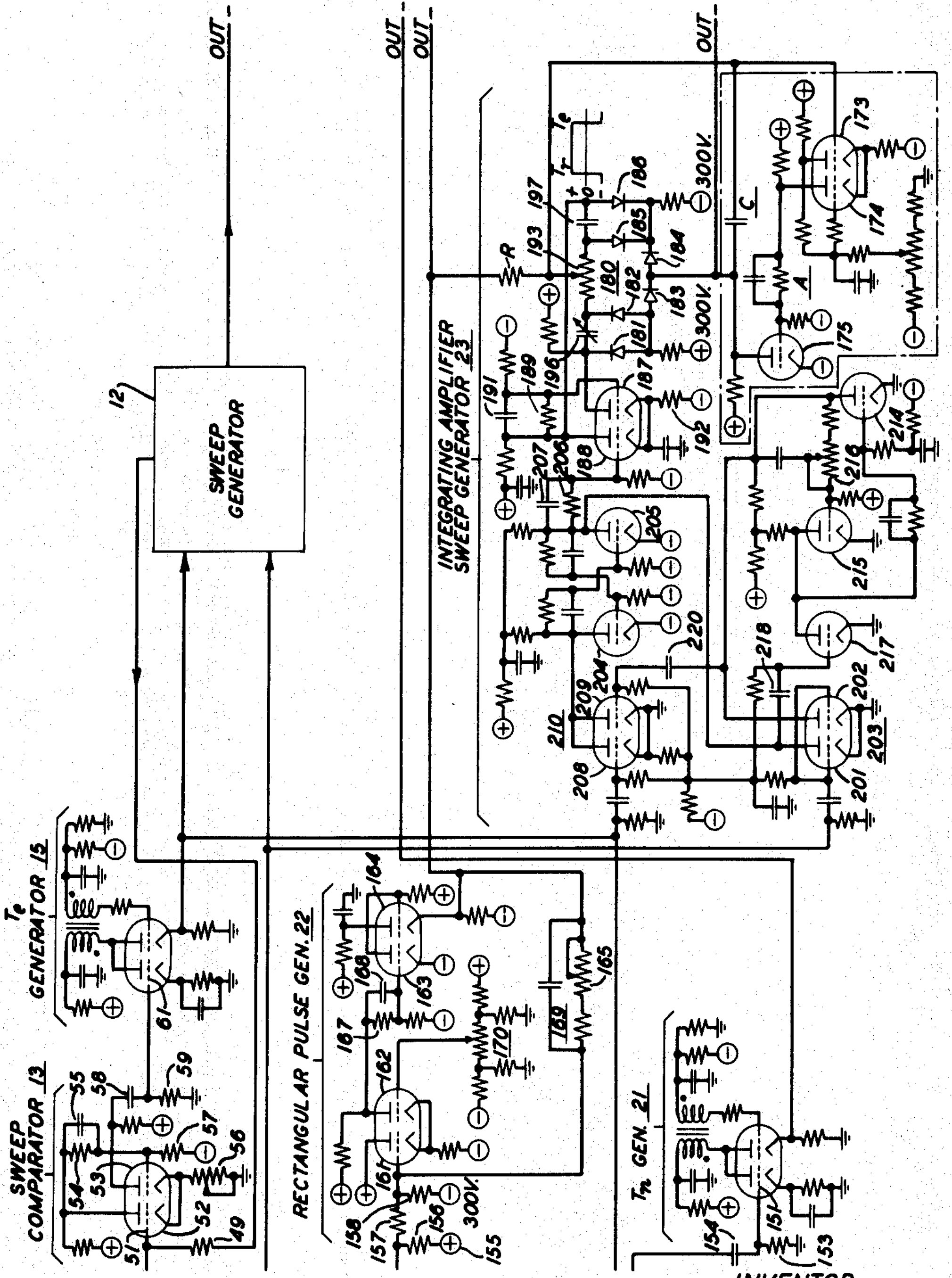

A suitable circuit arrangement for producing the desired rectangular and sawtooth pulse patterns is shown in FIGS. 2, 3 and 4, when arranged in the manner shown in FIG. 5. Referring to FIG. 3, there is shown a starter circuit 11 which comprises a symmetrical free-running multivibrator 27 and a triggered blocking oscillator 28. The multivibrator 27 is of conventional design and comprises a pair of triodes 31 and 33 having their plates and grids interconnected in standard fashion by capacitors 34 and 35.

While the circuit is designed to be symmetrical, it is understood that because of slightly differing tube parameters and the like, exact balance is never achieved and hence when the power is initially turned on one triode begins to conduct more heavily than the other. This results, in short order, in one triode conducting and the other cut-off. Assuming the triode 31 to be conducting, the negative potential on capacitor 34 holds the grid of triode 33 below cut-off. However, when capacitor 34 discharges sufficiently to allow the grid of triode 33 to rise to and beyond cut-off, the triode begins to conduct and its plate potential decreases. This decrease is coupled to the grid of triode 31 by capacitor 35, with the result that the plate current of triode 31 decreases and its plate potential increases. The action is regenerative and instantaneous so that triode 33 quickly assumes conduction and triode 31 is rapidly cut-off. This free-running "flip-flop" action continues as long as no external signals are applied to the circuit. The period of the free-running multivibrator is controlled by the ganged potentiometers 36 and 37.

The square wave signal appearing at the plate of triode 33 is coupled to the grid 38, of the parallel triggered blocking oscillator 28, by a short time constant, R–C differentiating circuit 30, 40. The blocking oscillator circuit 28 is of the type shown and described in "Radiation Laboratory Series" (1949), vol. 19, page 218, the operation of which will be briefly set forth herein. The double triode vacuum tube comprises a triode 41 which is normally conducting and a triode 42 which is normally cut-off due to the bias applied to its grid from the voltage divider 43, 44. The negative input pulses applied to grid 38 have no effect on the operation of the circuit, but the positive pulses applied thereto cause the triode 41 to draw more current, thus lowering the plate potential thereof. This lowering of the plate potential is regenerated through the transformer 45 to cause the grid potential of triode 42 to rise (transformer 45 provides a phase inversion). The rise in grid potential results in the conduction of triode 42 with the result that an even further lowering of the potential of the directly connected plates is achieved. A regenerative, positive feedback action takes place and continues until the triode 42 is driven to saturation. When saturation is reached, there is no voltage induced in the grid winding of transformer 45 and hence the process reverses. The grid of triode 42 begins to go negative, which results in increased plate potential, which in turn drives the grid still more negative. The end result of this operation is a short duration pulse (approximately one microsecond) of high amplitude.

The short duration pulse produced by blocking oscillator 28 is fed through the isolation diode 46 to the input of the sweep generator 12 to initiate a sawtooth sweep and start the chain of events. The sweep generator 12, which may be of any conventional design, produces a sawtooth sweep voltage of constant slope. The operation of the generator 12 is initiated and terminated in response to input triggering pulses.

As previously indicated, the circuitry, in part, is essentially a ring circuit, and hence there must be a starter pulse to start operation. This is the function performed by starter circuit 11. Once operation is initiated there is no further need of the starter circuit and the effect of the same may be eliminated. To this end the trigger pulses from $T_r$ generator 17 are fed to the grid of triode 31 through capacitor 47. The period of the free-running multivibrator 27 should be adjusted, by means of ganged potentiometers 36 and 37, so that it is just slightly longer than the period of the pulse pattern to be produced. Now inasmuch as the positive triggering pulse from differentiating circuit 30, 40 is produced when triode 33 goes from a conducting to a non-conducting state (rise in plate potential), the triode 33 will be conducting and the triode 31 cut-off in the latter half of the period of the free-running multivibrator. The positive $T_r$ pulses which are continuously fed to the multivibrator normally produce no effect thereon because the triode 31 is conducting during the first half of the period and is driven far into cut-off during the other half. As the end of the pulse pattern approaches, however, the charge on capacitor 35 will have leaked off sufficiently so that the grid of triode 31 is approaching the cut-off point. This is so because the multivibrator period is adjusted to exceed, slightly, the pulse pattern period. As the grid of triode 31 approaches cut-off, the $T_r$ pulse which initiates the first pulse of the next successive pattern will, when fed to the grid of triode 31, render the same conductive. This, of course, results in the triode 33 being cut-off which in turn produces a pulse from the blocking oscillator 28. The blocking oscillator pulse is coupled through the isolation diode 46 into the same line that delivers the $T_r$ trigger pulse to the sweep generator and since it is coincident in time with the $T_r$ pulse it performs no additional function thereover. Hence, the starter circuit, after the delivery of the first starter pulse, has no further effect on the operation of the system.

The sawtooth sweep voltage output of sweep generator 12 is fed to a shunt adder circuit 48 and 49 along with a preselected, negative, direct current voltage, derived from the comparison voltage generator 14 in a manner to be described. The junction of the shunt adder circuit is coupled to the grid 51 of triode 52 of the sweep comparator circuit 13. This sweep comparator is essentially a "Schmitt" trigger circuit and it is similar to the comparator circuit shown in "Radiation Laboratory Series" (1949), vol. 19, page 340. With a negative direct current voltage applied to resistance 48 and the sweep voltage, from sweep generator 12, applied to resistance 49, the voltage at the junction of the resistances will be proportional to the sum of the two applied voltages. The sweep voltage starts at zero and rises in a positive manner and hence the voltage at the junction point will initially be negative, which renders the triode 52 non-conductive. The resultant high potential at the plate of triode 52 is coupled to the grid of triode 53, by means of the resistor 54 and capacitor 55, and hence this triode conducts heavily. The variable resistance 56 is common to the cathode circuits of the triodes and it thus provides additional bias for the triode 52.

By means of the variable resistance 56, control may be had over the point at which triode 52 is rendered conductive in response to the changing voltage at the input grid. In the instant case, the resistance is adjusted to render the triode 52 conductive when the potential on grid 51 goes through zero. Therefore, when the sweep voltage from sweep generator 12 reaches an amplitude equal in value to the preselected direct current voltage from comparison voltage generator 14, the triode 52 conducts. This conduction results in a decreased plate potential which when coupled to the grid of triode 53 causes the latter to go negative as a result of the negative voltage applied through resistor 57. Since there is common coupling in the cathode circuits, the action is regenerative and it occurs rapidly, giving a sharp rise in the plate potential of triode 53. As long as the potential at grid 51 remains above zero volts the output voltage (at the plate of triode 53) remains at a high level. However, when the sweep is terminated, in a manner to be described, the comparator circuit is returned to its original state.

The positive going wavefront at the plate of triode 53, signifying voltage comparison, is fed to the grid 61 of the $T_e$ generator 15 via a short time constant, R-C differentiating circuit comprising capacitor 58 and resistor 59. The resultant positive "spike" from the differentiating circuit, when applied to the $T_e$ generator, produces a short duration pulse which is fed to the sweep generator 12 to end the sweep instantly. The $T_e$ generator 15 comprises a blocking oscillator which is substantially the same as that used in the starter circuit 11.

At the same time that the sweep is terminated, two additional circuits are actuated, simultaneously, in response to the $T_e$ trigger pulse. The retrace delay circuit 16 is rendered operative by the $T_e$ pulse and after a predetermined period of delay a pulse output therefrom is delivered to the $T_r$ generator 17 where it is regenerated and then fed to the sweep generator 12 to start the next sweep. The retrace delay circuit 16 is used simply to provide a short time delay before the initiation of the next sweep in the sweep generator 12. This is done to allow a period of recovery so that all transients incident to the sharply falling waveform will have time to die out.

The retrace delay circuit 16 comprises a cathode coupled monostable multivibrator which is essentially the same as that shown in "Radiation Laboratory Series" (1949), vol. 19, page 170. The circuit parameters are chosen so that the triode 63 is normally cut-off, while a triode 64 is normally conducting. The grid of triode 63 is at a selected positive potential determined by the voltage divider network 66 and 67. However, the heavy plate current flow of triode 64 creates a voltage drop across the common cathode resistor 65 which is sufficient to maintain the grid-to-cathode voltage of triode 63 below cut-off. The multivibrator circuit will remain in this state until a $T_e$ trigger pulse is applied to the grid of triode 63, at which time triode 63 is driven into conduction and triode 64 is cut-off. The time that triode 64 will remain off depends upon the time it takes the negative potential on capacitor 68 to discharge sufficiently through the resistive network comprising resistances 71, 72 and 73, and since resistance 72 is variable this time can be controlled. After a set time, the charge on capacitor 68 will have leaked off sufficiently to permit triode 64 to again conduct, triode 63 then of course returning to cut-off.

The output is taken from the plate of triode 63 and delivered to the input of $T_r$ generator 17 via a short time constant, R-C differentiating circuit 74, 75. The "positive-going" trailing edge of the rectangular waveform, appearing at the plate of triode 63, will result in a positive "spike" from the differentiating circuit. This spike when applied to the $T_r$ generator 17 results in the production of a short duration, high amplitude pulse. Thus, the time spacing between the $T_e$ trigger pulse, which ends a sweep, and the $T_r$ trigger pulse, which starts the next sweep, is determined by the length of time the triode 63 remains conducting and this is controlled by the variable resistance 72.

The $T_r$ generator 17 comprises a blocking oscillator which is again substantially the same as that used in the starter circuit 11, and hence additional discussion thereof is not believed warranted. As stated, the pulse produced by the $T_r$ generator 17 is delivered to the sweep generator 12 to start the next sweep.

The $T_e$ trigger pulse is also fed to the beam stepping tube driver circuit 18 to cause the driver to step or advance the beam of the beam stepping tube to the next target position in a manner to be described. The beam stepping tube driver comprises a bistable multivibrator circuit of the Eccles-Jordan type, and it is substantially shown and described in "Radar Electronic Fundamentals, Navships 900,016" (1944), published by the U.S. Government Printing Office, pages 192–194. Briefly, the circuit possesses two conditions of stable equilibrium so that it will not change from one state to another except in response to an input triggering pulse. Thus, assuming the triode 81 to be conducting and the triode 82 cut-off, the $T_e$ trigger pulse, coupled to the respective grids by means of capacitors 83 and 84, will cause the conditions of the triodes to be reversed. The triode 81 being in a conducting state, the $T_e$ trigger pulse will have little, if any, effect on the flow of current therethrough. The triode 82, however, is cut-off and the positive pulse on its grid removes the high negative bias momentarily. Current then flows in the plate circuit of triode 82 and the voltage at its plate drops. This decrease is coupled to the grid of triode 81 and by a rapid regenerative action the triode 81 is cut-off, while triode 82 conducts. The next successive $T_e$ pulse, of course, again reverses the conditions of the triodes. The diode 85 is used to short to ground any negative transients associated with the $T_e$ triggering pulses.

The resistors 86, 87, 87*a* and 88 are used to set the waveforms, at the plates of triodes 81 and 82, to the proper direct current level with respect to the potential of the cathodes of the beam stepping tubes 91 and 92. The cathodes 93 and 94 of the tubes 91 and 92 are directly connected together and to ground potential through resistor 95 and capacitor 96, the charge on the latter maintaining the cathodes at a positive potential (approximately 40 volts) during operation. The voltage swing at the plates of triodes 81 and 82 is from zero to approximately 80 volts positive. In order for the waveforms to go completely to zero volts the cathodes of the triodes 81 and 82 must be returned to a negative potential. The voltages thus applied to the alternate grids of the beam stepping tubes appear as a positive and negative 40 volts with respect to the cathodes thereof.

The beam stepping tube circuit 19 comprises one or more beam stepping tubes of conventional design. In the circuit shown two such tubes are connected in tandem so as to function in the same manner as a single tube. Since beam stepping or switching tubes and this manner of connecting them are well known in the art, their operation in the present system will only be briefly set forth. For a more detailed description of beam stepping tubes and the operation thereof, reference should be had to U.S. Patent 2,807,748, D. H. Lee, September 24, 1957, and the references cited therein, and to "Pulse and Digital Circuits" by Millman and Taub (1956), McGraw-Hill Book Company, pages 339–343.

Each of the beam stepping tubes 91, 92 includes a cathode 93, 94, respectively, and ten positional sets of tube electrodes. Each of these positional sets includes a spade electrode, such as illustrated in the drawing by reference numerals 101, 111, 121, 131 and 141, a grid electrode 102, 112, 122, 132 and 142 and a target electrode 103, 113, 123, 133 and 143. If the said ten positional sets of each tube are numbered consecutively from left to right, it will be seen that the grids of the odd numbered positions are all interconnected to each other. The grids of the even numbered positions are likewise interconnected to each other, and the odd numbered grids of tube 91 are connected directly to the even numbered grids of tube 92, while the even numbered grids of tube 91 are connected to the odd numbered grids of tube 92. The spades have a series resistance individual to each and all spades are coupled to a positive source 87 through a variable potentiometer 88. The manner of interconnecting the targets will be described hereinafter.

Disregarding for the moment the beam stepping tube driver 18, when the circuit is initially turned on the targets and spades of both the tubes 91 and 92 have the same respective potential. In this condition, the beam of electrons simply circles around the cathode, as in a static magnetron, and no tube current flows. The tubes are thus cut-off and the voltage at the cathodes is zero since there is no current flowing in the common cathode circuit. The tubes will remain in this state until some external starting signal is applied to cause the beam to "lock-on" a selected target. This is the function performed by the beam stepping tube starter 98. The cathode of the starter 98 is directly connected to the cathodes 93 and 94 and hence, like the latter, it is at zero potential. Now since the grid of the starter 98 is directly connected to ground, the grid and cathode are both at zero potential and the triode conducts heavily. The plate of starter circuit 98 is connected to the junction of resistors 99 and 100, which are located in the load circuit of spade 101. The heavy conduction of the triode of the starter circuit causes a substantial voltage drop across the resistor 100 with the result that the potential of spade 101 is lowered with respect to the potential applied to the other spades. This causes the beam of electrons to "lock-on" target 103. Once current begins to flow, the potential at the directly connected cathodes 93, 94 is increased to approximately 40 volts positive and this, when applied to the cathode of the starter circuit 98, biases the starter beyond cut-off.

When the electron beam locks on the target 103, the potential applied to the grid 102 will be approximately 40 volts positive with respect to the cathode 93. This is easily assured by choosing circuit parameters for driver 18 such that triode 81 will conduct and triode 82 cut-off when the circuit is initially turned on. The grid-to-cathode potential of the second positional set (112 to 93) is held at approximately 40 volts negative. As long as this condition persists the electron beam will remain locked on target 103.

To cause the beam to step or switch to the next target position 113, it is necessary to drive grid 102 to a negative potential, with respect to cathode 93, and grid 112 to a positive potential. This is accomplished by the $T_e$ trigger pulse which when fed to the grids of triodes 81 and 82 causes triode 82 to conduct (lowering its plate potential) and triode 81 to cut-off (raising its plate potential).

The next successive $T_e$ pulse again reverses the state of the triodes 81, 82 and now the grid 112 is at a relatively negative potential and the next succeeding target at a positive potential causing the beam to again advance. Thus, each time the state of the driver circuit 15 is altered, in response to a $T_6$ pulse, the beam of the beam stepping tube 91 is shifted to the next adjacent target position.

The beam will be advanced to successive targets in beam stepping tube 91 until it reaches target 123. The target 123 is connected to the junction of resistors 105 and 106 which are series connected in the spade circuit 131. When the beam initially impinges on target 123 the target-to-cathode current flow is through resistor 105, potentiometer 88, positive supply 87 and then back to the cathode through the resistor 95. The voltage drop across resistor 105 lowers the potential at spade 131, with respect to the potential of the other spades of tube 92, thus causing the beam of tube 92 to immediately lock-on target 133. It will be noted that the grid 132 is at the same positive potential with respect to the cathode potential as grid 122 of tube 91.

The action of the preceding paragraph is accompanied by the extinguishment of the beam of tube 91, that is, the beam returns to its original state wherein the electrons merely circle or swarm around the cathode. This is accomplished by using a resistor 105 which is substantially larger than the load resistors associated with the other targets of tube 91 and a resistor 107, in series with spade 121, which is substantially less than the resistors in the load circuits of the other spades of tube 91. The larger size of resistor 105 results in a decreased target-to-cathode current flow (123 to 93) and this in turn results in less electron impingement upon spade 121. The reduced current flow in spade circuit 121 coupled with the low value of resistor 107 causes the potential at the spade 121 to approach the potential of the other spades and this results in the beam being extinguished.

When the beam of beam stepping tube 92 advances to target 143 it is extinguished and a beam is reinitiated in stepping tube 91 in the same manner as set forth above, the target 143 being connected to the junction of resistors 99 and 100 in the load circuit of spade 101.

The potentiometer 88 provides a stability adjustment and it is used to adjust the voltage level of the spades to the critical value at which beam stepping or advancement takes place.

The targets of the beam stepping tubes 91 and 92 are each connected to a positive voltage supply, which by way of example may be 300 volts, through potentiometers, such as shown by reference numerals 103A, 113A, 114A, 133A and 134A. The wiper arms of all the potentiometers are connected together, through a diode 109 individual to each, and to a positive source (again, 300 volts) through resistor 110. These potentiometers, containing the suffix (A), are used to control the amplitudes of the successively generated sawtooth sweeps produced by sweep generator 12. To this end, the wiper arms are coupled to the input of a shunt adder network, comprising resistors 124 and 125, via the diodes 109.

For purposes of explanation, assume the beam to be locked on the target 103. The current flow through potentiometer 103A will produce a drop of approximately 80 volts thereacross and hence the voltage at the wiper arm may be adjusted to any value between +220 and +300 volts. Assume the arm to be set to the +280 volt point. Since the beam is incident only on target 103 of tube 91, and there is no beam at all in tube 92, there is no current flow in any of the other target circuits and hence the wiper arm of potentiometer 103A is the only one at a voltage less than +300 volts.

The +280 volts at the wiper arm of potentiometer 103A is applied to the cathode of the series connected diode 109, the diode being connected in an "OR" circuit. Since the anode of the diode is connected to the +300 volt source through the resistor 110, the diode is forward biased and passes its cathode voltage through to the anode. All of the other diodes will be reverse biased, however, for the +280 volts will be applied to the anodes thereof, while a +300 volts will appear at the cathodes. The "bus" or line that connects all the anodes will thus be at a potential determined by the setting of the potentiometer associated with the target upon which the beam is impinging.

The +280 volts on the common anode bus is fed to resistor 124 of the shunt adder network, while the resistor 125 is tied to a source of 300 volts negative (equal and opposite to the supply voltage for the targets of the beam stepping tubes). The resistors 124 and 125 are of the same value and the voltage at the junction thereof is equal to one half the sum of the voltages applied to the input, namely, 10 volts negative in the assumed case.

The comparison voltage generator 14, including the shunt adder network 124, 125, comprises a direct current summing amplifier which serves to produce an output, at the plate of triode 128, which is equal to the sum of the input voltages. In the assumed case this output will be 20 volts negative (sum of 280 volts positive and 300 volts negative). The summing amplifier used herein is of the type disclosed in "Electronic Analog Computers" by Korn and Korn (1952), McGraw-Hill Book Company, pages 11–14 and 192–193.

With the triodes 126–128 conducting, any increased negative potential at the grid of triode 126, due to the beam stepping tube circuit providing a less positive potential for the next successive target position, causes an increased potential at the plate of triode 126. This latter increase, when conveyed through capacitor 137 and resistor 138 to the grid of triode 128 causes increased current flow therethrough and hence a decrease in potential at the output plate. Through the proper selection of the circuit parameters, the overall gain of the summing amplifier may be adjusted to unity, that is, the direct current output signal at the plate of triode 128 will be the exact sum of the input potentials and thus it will reflect, inversely, the variations in the positive input potentials applied to resistor 124. To produce a negative output, of course, it is necessary to return the cathode of triode 128 to a negative potential.

The required negative feedback is achieved by coupling the plate of triode 128 to the grid of triode 127 through the capacitor 145 and resistor 146. Any shift in potential at the plate of triode 128 will cause a corresponding shift in the potential at the grid, and hence likewise at the cathode, of triode 127. However, since the triodes 126 and 127 possess a common cathode resistor 147, an opposite effect is produced in the grid-to-cathode potential of triode 126, and hence negative feedback is provided. The voltage divider arrangement 140 merely provides an adjustment for assuring an output potential of zero volts, at the plate of triode 128, when an input of zero volts appears at the grid of triode 126.

From the above discussion it will be seen that a number of successive, negative, direct current potentials will appear at the output of the comparison voltage generator 14 and the exact number will depend upon the number of separate target output circuits in the beam stepping tube circuit 19.

In the beam stepping tube circuit shown, two tubes were connected in tandem to provide a pattern of eighteen separate outputs therefrom. It should be clear, however, to those skilled in the art that the number of separate outputs from the beam stepping tube circuit may be readily varied. For example, the circuit may comprise only one beam stepping tube or alternatively may comprise three, four, five or even more such tubes connected in the described manner.

Further, the circuitry of each tube may be readily modified to provide a decreased number of target output circuits per tube. The manufacturers of these tubes suggest ways in which the same may be accomplished.

Alternatively, the third, fourth or fifth target, for example, of tube 91 may be connected to the spade 131 of tube 92, rather than the tenth target as shown, and the same or a different numbered target of tube 92 may be connected to the spade 101 of tube 91, in the same manner as described. This provides five, six, seven or more outputs from the beam stepping tube circuit depending upon the exact type of tube interconnection used.

The successively generated sawtooth sweep voltages of sweep generator 12 are compared to the successive outputs of the comparison voltage generator 14 and since the latter may be controlled in amplitude through target potentiometer adjustment, a repetitive, amplitude modulated, sawtooth pulse pattern can be obtained.

The first sawtooth pulse is generated in response to the starter pulse from the starter circuit 11. This is compared with a negative direct current voltage whose amplitude is controlled by the potentiometer 103A. At the instant of comparison, the sweep is terminated by a $T_e$ trigger pulse, which also serves to step the beam of circuit 19 to target 113. After a short delay time a $T_r$ pulse is generated and used to initiate the second sawtooth pulse which in turn is compared to a second negative potential whose amplitude is controlled by potentiometer 113A. This process then continues over and over again as previously described.

Figure 6:
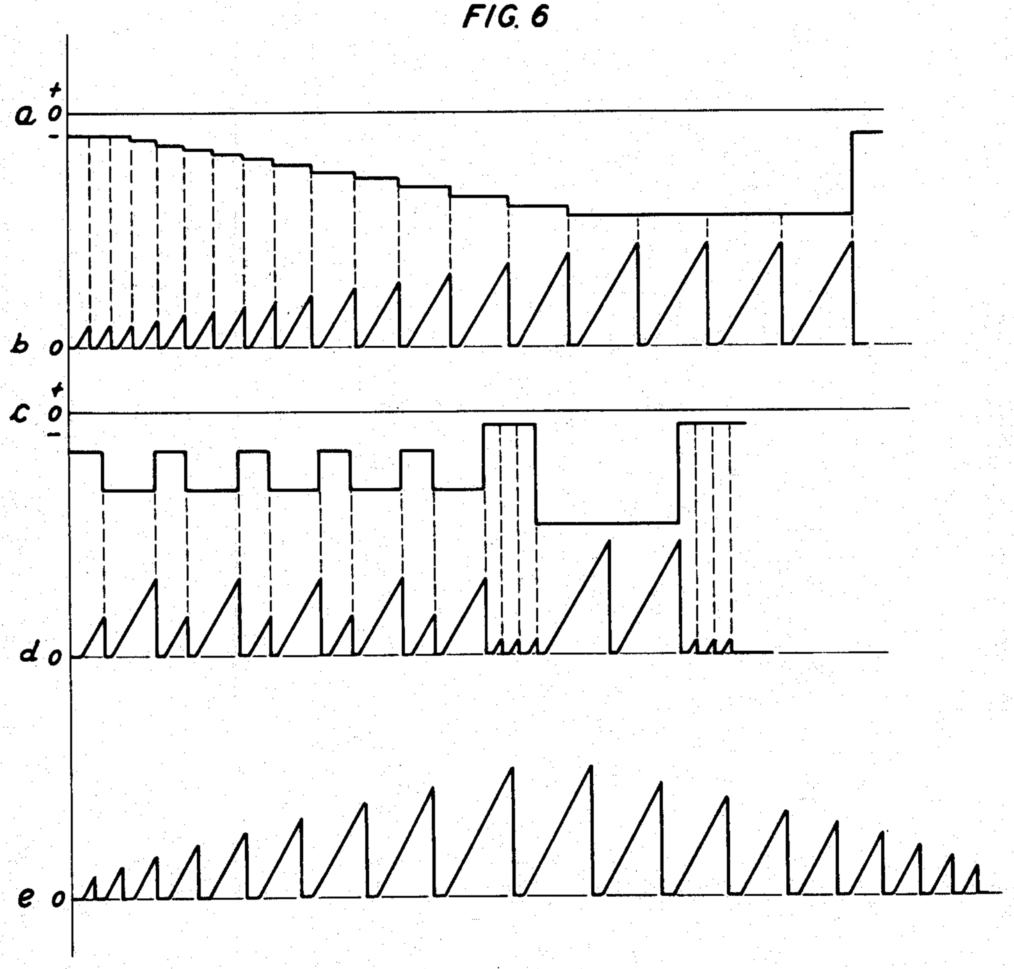
FIGS. 6 and 7 show the waveforms that may be obtained at various places in the pulse generator system of FIG. 1.

The waveforms appearing at the output of the comparison voltage generator 14 and the sweep generator 12 are illustrated in FIG. 6 by the waveforms *6a* and *6b*, respectively, for one setting of the target potentiometers. The waveform *6b* represents one complete pulse pattern wherein the amplitude of each sawtooth pulse is equal to the negative potential of the waveform *6a* corresponding in time therewith. The sawtooth pulses are of constant slope, and hence the time duration of each pulse is dependent upon its preassigned amplitude, as determined by potentiometer setting. The time spacing between the pulses of waveform *6b* is that set by the retrace delay circuit 16.

The waveforms *6c* and *6d* are similar to *6a* and *6b* except for the fact that the target potentiometer settings have been changed. It will be apparent at this point that the sweep generator 12 can be made to produce a wide variety of repetitive, amplitude modulated, sawtooth pulse patterns. The waveform *6e* merely illustrates one more type of sawtooth pulse pattern that can be obtained. In the waveforms *6b*, *6d* and *6e* the "flyback" time of the sweep generator 12 has been ignored.

It was previously assumed that the grid 102 of beam stepping tube 91 would be at 40 volts positive with respect to the cathode when the electron beam locks on the target 103. As pointed out, this can be obtained through the proper choice of parameters for driver 18. However, if this condition should not obtain and the grid 102 is at 40 volts negative, the beam will initially impinge on target 103 and then rapidly step or advance to the target 113 whose grid is, of necessity, at 40 volts positive with regard to the cathode. This would result merely in the first pulse pattern comprising seventeen, rather than eighteen, pulses.

The $T_n$ generator 21 comprises a parallel triggered blocking oscillator circuit which is substantially the same as that used in the starter circuit 11. The input grid 151 of the $T_n$ generator is coupled to the target 152 of beam stepping tube 92 through a short time constant, R-C differentiating circuit comprising resistor 153 and capacitor 154. When the beam advances to the target 152, the target-to-cathode current causes a decrease in target potential. After a preselected period of time the beam leaves target 152 and is reinitiated in tube 91 to begin the cycle anew. At this time the target potential returns to the level of the supply potential, namely, 300 volts. The positive going potential on target 152 results in a positive "spike" from the differentiating circuit, which when applied to grid 151 causes the $T_n$ generator to produce a short duration, high amplitude pulse. This pulse will accordingly be produced once per pulse pattern, at the completion thereof, and, while not of substantial utility in and of itself, it can be used as a synchronization pulse for oscilloscopes and other equipment to which the pulse generator system may be connected.

A second group of potentiometers, such as those indicated by reference numerals 103B, 113B, 114B, 133B and 134B, are connected respectively to the targets of the beam stepping tubes in parallel with the first-mentioned potentiometers 103A, 113A, etc. The wiper arms of these additional potentiometers are connected together, through a diode 120 individual to each, and to positive source 155 through resistor 156. These latter potentiometers, containing the suffix (B), are used to control the amplitudes of the pulses dervied from the rectangular pulse generator 22. To this end, the wiper arms are coupled to the input of a shunt adder network, comprising resistors 157 and 158, via the diodes 120.

The diode "OR" circuit, the positive source 155, and the shunt adder network 157, 158, function in the same manner as that set forth above with regard to the corresponding elements associated with the (A) set of potentiometers. Accordingly, the input to the grid of triode 161 comprises successive negative potentials, the amplitudes of which are controlled by the (B) set of potentiometers.

The rectangular pulse generator 22, including the shunt adder network 157, 158, comprises a direct current summing and inverting amplifier. Like the summing amplifier circuit of the comparison voltage generator 14, this circuit serves to produce an output which is equal to the sum of the input voltages. However, because of the added inverting function the output will have a polarity which is the opposite of the input polarity. That is, unlike the comparison voltage generator output, the output from rectangular pulse generator 22 will be positive.

As with the previous discussion of the comparison voltage generator circuit 14, let it be assumed that the potential applied to the grid of triode 161 increases in the negative direction. This will cause a similar proportionate increase at the cathodes of triodes 161 and 162, and since the grid of triode 162 remains at essentially a constant potential, the plate potential of triode 162 is decreased (grid becomes more positive with respect to cathode thereby increasing plate current flow). This decrease is in turn coupled to the grid of triode 163 by the parallel resistor 167 and capacitor 168 to thereby increase the plate potential thereof. The plate of triode 163 is directly connected to the grid of cathode follower 164 and hence the cathode potential, following the grid variations, increases in a positive direction. The overall gain of the rectangular pulse generator 22 may be adjusted to unity so that the direct current output signal, at the cathode of triode 164, will be equal to the sum of the input potentials to the shunt adder network 157, 158, but the output signal will be of opposite polarity to said sum.

The required negative feedback for this operational amplifier is achieved by coupling the output at the cathode of triode 164 to the input grid of triode 161 through the resistive feedback network 169. The variable resistance 165 in the feedback network controls the amount of feedback and thus controls the gain of the circuit. The voltage divider arrangement 170 performs the same function as the voltage divider 140 of the generator circuit 14.

Figure 7:
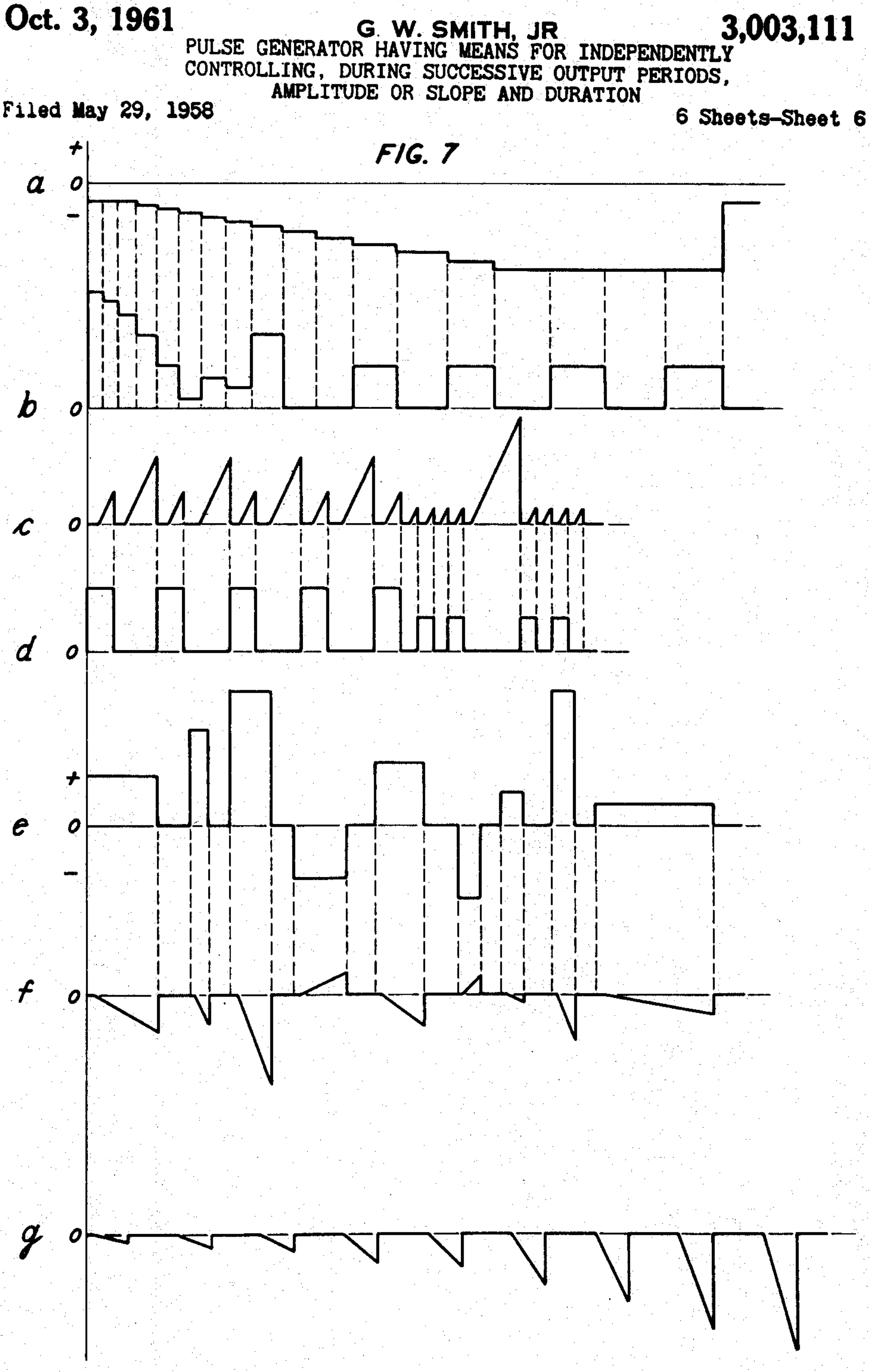

A typical wave form that may be produced at the output of the rectangular pulse generator 22 is illustrated by the waveform *7b* of FIG. 7. Waveform *7a* corresponds to waveform *6a* and it represents the wave that may be produced at the output of the comparison voltage generator 14. The successive amplitudes of waveform *7b* are controlled by the (B) set of potentiometers while the time duration thereof corresponds to waveform *7a*.

Time duration, it will be recalled, is set by the (A) potentiometers inasmuch as they limit the amplitudes of the successive sweeps of sweep generator 12 and hence indirectly control the time that the beam of the beam stepping tube remains at each target position.

Since the amplitudes of the successively derived direct current voltages, from rectangular pulse generator 22, can be varied by potentiometer adjustment from zero potential to some maximum value, a rectangular pulse pattern of any selected configuration can be achieved. Such a pulse pattern is illustrated in the latter half of waveform *7b* and in waveform *7d*. The waveform *7c* is related to waveform *7d* in that it will appear at the output of sweep generator 12 when waveform *7d* appears at the output of pulse generator circuit 22. In waveform *7d* the (B) potentiometers associated with the odd numbered target positions control pulse amplitude, while the potentiometers associated with the even numbered target positions are set to provide zero potential at the output of pulse generator circuit 22, that is, they are set to the level of the positive supply (300 volts). The leading and trailing edges of the rectangular pulses of waveform *7d* correspond to the trailing edges of the sawtooth pulses of waveform *7c* and hence the time duration and spacing of the rectangular pulses are controlled by the (A) potentiometers. It must be noted, however, that pulses of even greater duration or time spacing may be achieved simply by setting the (B) potentiometers of adjacent targets to the same potential.

The pulses of the waveforms of *7b* and *7d* are all of positive polarity. However, it is within the contemplation of the present invention to provide waveforms of positive, negative or mixed polarity pulses. For example, in *7e* the waveform comprises a number of positive pulses and a pair of negative pulses. This may be readily accomplished by returning the resistor 158 to a negative potential something less than 300 volts (e.g., 260 volts). Accordingly, the potential at the input of the grid of triode 161 can be either negative or positive depending upon the setting of the potentiometer associated with the target upon which the beam is impinging. A negative input to the grid of triode 161 will result in a positive output pulse, while a positive input will produce a negative output pulse.

The pulse pattern appearing at the output of the rectangular pulse generator 22 is delivered to the integrating amplifier sweep generator circuit 23 along with the $T_r$ and $T_e$ trigger pulses from the $T_r$ and $T_e$ generators. The sweep generator circuit 23 functions as an integrator to produce a sawtooth sweep voltage output in response to a rectangular-wave voltage input, the slope or rate of rise of the sweep being a function of the amplitude of the input voltage.

The integrating amplifier sweep generator 23 is diagrammatically set forth in FIG. 4A. With the exception of the switch S, the generator 23 is a standard integrating operational amplifier comprising an input resistance R, a direct current amplifier A, and an integrating capacitor C in the feedback path of the amplifier. As set forth in pages 10–18 of the previously noted book by Korn and Korn, the operational amplifier will provide an output which is proportional to the integral of the input voltage, the relationship being $$e_o = -\frac{1}{RC}\int_0^t e_i dt$$

The minus sign in the equation indicates a phase reversal between the input and output signals.

The switch S short-circuits the capacitor C so that when closed no charge can develop on the capacitor. The $T_r$ and $T_e$ trigger pulses fed to the sweep generator circuit 23 correspond functionally to the switch S in that they perform a switching operation. The $T_r$ pulses initiate generator operation and thus are equivalent to the opening of the switch, while the $T_e$ pulses terminate operation and are equivalent to the closing of the switch. However, whether the presence of a $T_r$ pulse does in fact initiate a sweep depends upon whether a voltage is applied to the input.

Turning to FIG. 4, the operational amplifier portion of sweep generator circuit 23 is shown within the box defined by the dotted line, the remaining portion of the circuit serving to provide the switching operation in response to the $T_r$ and $T_e$ pulses.

The rectangular pulse pattern from pulse generator 22 is delivered to the input grid of triode 173 via the resistor R. The triodes 173, 174 and 175 comprise a direct current amplifier which is similar in nature to that of the rectangular pulse generator circuit 22 (the cathode follower stage 164 being omitted herein). However, the negative feedback loop of the latter is eliminated and an integrating capacitor C is coupled between the plate of the output triode 175 and the grid of the input triode 173. The output signal is taken from the plate of triode 175. The operation of electronic integrators being well known in the art and adequately covered in the literature, suffice it to say that a sawtooth sweep voltage output will be produced in response in a rectangular-wave voltage input and the slope of the sweep will be a function of the amplitude of the input voltage.

The integrating capacitor C is short-circuited by a six-diode gating arrangement 180. Diodes 181–186 are so poled that in one state, to be described, the diode gate appears as a short circuit across the capacitor C and in the other state it appears as an open switch of infinite impedance. The cathode of diode 181 is connected directly to the plate of triode 187, while the anode of diode 186 is connected to the plate of triode 188. The triodes 187 and 188 comprise a balanced direct current amplifier and inverter. The plate of triode 188 is coupled to the grid of triode 187, by means of a resistor 189 and capacitor 191, so that with the plate of triode 188 at a relatively high potential, the plate of triode 187 will be at a relatively low potential and vice versa. By returning the cathodes to a negative potential through the common cathode resistor 192, the plate potentials may be made to vary above and below zero volts. For purposes of explanation, the plate potentials will be assumed to be approximately 70 volts, positive or negative.

Since the anode of diode 181 is connected to a +300 volt source the diode is normally forward biased and the potential at the cathode is passed through to the anode. In like manner, the diode 186 is normally forward biased and the potential at its anode is passed through to the cathode.

If the plate potential of triode 188 is now assumed to be approximately 70 volts negative, the plate potential of triode 187 will be 70 volts positive. The 70 volts negative will be passed by diode 186 to the junction of diodes 184 and 185, and, likewise, the 70 volts positive will be passed, with little attenuation, to the junction of diodes 182 and 183. In this assumed condition, the diodes 183 and 184 will be forward biased, as will the diodes 182 and 185, with the result that any signals applied to the wiper arm of potentiometer 193 will be passed through the diode gate with little attenuation. And since the capacitor C is directly connected across the diode gate, it is effectively short-circuited.

With the plate potential of triode 188 at 70 volts positive and the plate of triode 187 at 70 volts negative, the diode gate assumes its other condition. The diode 181 will pass the −70 volts to the junction of diodes 182 and 183, while the diode 186 passes the +70 volts to the junction of diodes 184 and 185, with the result that the diode pairs 183, 184 and 182, 185 are reverse biased and the diode gate appears as an open switch. In this latter condition, the integrating capacitor C will be permitted to charge. Therefore, with a pulse type signal applied to the diode 186, such as shown adjacent thereto, and an equal and opposite signal applied to the diode 181, the capacitor will be permitted to charge throughout the time duration of the pulse signal. The remaining portion of the sweep generator circuit is used to initiate these pulse signals in response to input $T_r$ pulses and terminate the same in response to $T_e$ pulses.

The capacitors 196 and 197 and the potentiometer 193 are used for diode gate balance adjustment.

A $T_r$ pulse from $T_r$ generator 17 is applied to the grids of triodes 201 and 202 of a pulse amplifier circuit 203. The resultant amplified negative pulse at the plate of triode 201 is fed to the plate of triode 205 which it will be assumed is at a high potential (triode 205 is cut-off). The triodes 204 and 205 comprise a symmetrical bistable multivibrator of substantially the same type previously described in regard to driver circuit 18. In this instance, however, the multivibrator is triggered in the plate circuit. The negative pulse applied to the plate of triode 205 causes the same to conduct and triode 204 to cut-off. The resultant decreased potential at the plate of triode 205 is coupled to the grid of triode 188 through the resistor 206 and capacitor 207 and this results in an increased potential at the plate of triode 188, which, as previously described, in turn causes a decreased potential at the plate of triode 187. These latter plate potentials will cause the diode gate 180 to appear as an open circuit thereby permitting the capacitor C to charge. Since the multivibrator is bistable, the circuit remains in this condition until the application of another input triggering pulse.

The $T_e$ pulse, which follows sometime after the $T_r$ pulse, is applied to the grid of triode 208 of a second pulse amplifier circuit 210. This $T_e$ pulse is regenerated and appears at the plate of triode 208 as an amplified negative pulse which when fed to the plate of triode 204 of the multivibrator reverses the condition thereof. The ensuing return of the plate of triode 205 to a high potential reverses the potentials at the plates of triodes 187 and 188. With the plate of triode 188 again at a low potential and the plate of triode 187 at a high potential, the diode gate appears as a short circuit across the integrating capacitor.

For purposes of explanation, it was assumed that at the time of the first $T_r$ pulse, the triode 204 of the bistable multivibrator was conducting with the triode 205 cut-off. The $T_r$ pulse, regenerated in triode 201, then reversed this condition and rendered triode 205 conducting which in turn opened the diode switch across capacitor C. Let it be supposed, now, that at the time of occurrence of the first $T_r$ pulse, the triode 205 was in fact conducting. The negative pulse at the plate of triode 205 would of course have no effect on the multivibrator. However, with the triode 205 already conducting the multivibrator is in the proper state to render diode switch 180 open. Accordingly, the operation of the circuit is not affected by the state initially assumed by the multivibrator. The later $T_e$ pulse will reset the multivibrator as explained and thereafter the circuit will perform as previously described.

The $T_r$ input pulse is also delivered to the grid of the triode 202, the grids of triodes 201 and 202 being directly connected together. The resultant amplified negative pulse at the plate of triode 202 is fed to the plate of triode 214 which, with triode 215, comprises a monostable multivibrator. The triode 215 is normally conducting due to the positive voltage applied to its grid, while the triode 214 is normally cut-off. The applied negative pulse reverses the conditions of the triodes so that triode 214 will be driven into conduction while triode 215 is temporarily cut-off. The time that the monostable multivibrator remains in this unstable state depends upon the setting of variable resistance 216.

Assume, for the present, that a $T_e$ pulse arrives before the monostable multivibrator returns to its original state. Now as previously described, the $T_e$ pulse will return the bistable multivibrator to its original state with triode 204 conducting and triode 205 cut-off. The return of the plate of triode 205, to a high potential, is coupled to the grid of triode 217 by means of capacitor 218. This increased potential on the grid of triode 217 results in a sharp negative-going wavefront at its plate and since the latter is directly connected to the plate of triode 215, which is temporarily cut-off, the monostable multivibrator is reset to its normal state.

Assume now the alternative situation, namely, that the variable resistance 216 is adjusted to return the monostable multivibrator to its original state prior to the presence of a $T_e$ pulse at the grid of triode 208. Upon return to the said original state the potential on the plate of triode 214 rises sharply. This rise is coupled to the grid of triode 209 via the capacitor 220. The resultant drop in the plate potential of triode 209 when coupled to the plate of triode 204, of the bistable multivibrator, returns the latter to its original state of conduction. Thus, the termination of the period of the monostable multivibrator is equivalent in function to an incoming $T_e$ pulse. From the foregoing it will be understood that the purpose of the monostable multivibrator is to limit the length of time that the generator circuit 23 integrates. The period of the monostable multivibrator will be set to exceed, slightly, the period of the longest time duration sawtooth pulse to be produced.

In FIG. 7, the waveforms *7f* and *7g* are typical of those that may be produced at the output of the integrating amplifier sweep generator 23. The waveform *7f* would be produced in response to waveform *7e* at the input. Comparing waveforms *7e* and *7f* it will be seen that the slope of each sawtooth pulse is a function of the amplitude of the input rectangular pulse producing it. The time duration and spacing of the sawtooth pulse pattern corresponds closely to that of the rectangular pulse pattern. In this last regard, it will be noted that each sawtooth pulse starts a short time after the leading edge of the related rectangular pulse. This short period is that introduced by the retrace delay circuit 16 and it would be measured in microseconds. The amplitude of each sawtooth pulse is a function of its rate of rise and time duration. And, as previously described, the polarity of each sawtooth pulse is the inverse of the applied rectangular pulse.

The waveform *g* comprises a group of equal duration pulses equally spaced apart. However, the slope increases for successive pulses and hence the amplitude likewise increases. The polarity of the pulses of waveform *7g* can be readily reversed by delivering the same to the input of a (−1) amplifier.

In summary, it will be seen that the repetitive sawtooth pulse pattern from the integrating amplifier sweep generator 23 can be controlled so that the individual pulses thereof may be varied either in slope (by the B potentiometers which control the amplitude of the input rectangular pulses); in time duration and spacing (by the A potentiometers which control the length of time that the beam of the beam stepping tube remains at any target position); in amplitude (by the A and B potentiometers which control, respectively, the time duration and amplitude of the input rectangular pulses); and in polarity (by the B potentiometers, with the resistor 158 returned to an intermediate negative potential).

It should be understood that the foregoing disclosure relates to only a preferred embodiment of the invention and that numerous modifications and alterations may be made therein without departing from the spirit and scope of the invention.

What is claimed is:

1. In combination, a sawtooth sweep generator operative in response to an input triggering pulse to initiate a sweep, means including a beam stepping tube for generating a comparison voltage, voltage comparison means coupled to the output of said generator and the first-mentioned means and serving to generate a signal when the sweep output of said generator reaches a predetermined relative magnitude with respect to said comparison voltage, means for applying said signal to said generator to terminate said sweep, a beam stepping tube driver operative in response to said signal to cause the beam of said beam stepping tube to advance to the next selected position, means for reinitiating a sweep output from said generator a predetermined time after the generation of said signal, and means coupled to said beam stepping tube for independently controlling the comparison voltage output of the first-mentioned means for each position of the beam of said beam stepping tube.

2. In combination, a sawtooth sweep generator operative in response to an input triggering pulse to initiate a sweep, means including a beam stepping tube for generating a comparison voltage, voltage comparison means coupled to the output of said generator and the first-mentioned means and serving to generate a pulse signal when the sweep output of said generator reaches a voltage equal in magnitude to said comparison voltage, means for applying said pulse signal to said generator to terminate said sweep, a beam stepping tube driver operative in response to said pulse signal to cause the beam of said beam stepping tube to advance to the next selected target position, means for reinitiating a sweep output from said generator a predetermined time after the generation of said pulse signal, and means coupled to said beam stepping tube for independently controlling the comparison voltage output of the first-mentioned means for each position of the beam of said beam stepping tube.

3. In combination, a sawtooth sweep generator operative in response to an input triggering pulse to initiate a sweep, means comprising a plurality of beam stepping tubes connected in tandem for generating a comparison voltage, voltage comparison means coupled to the output of said generator and the first-mentioned means and serving to generate a pulse signal when the sweep output of said generator reaches a predetermined magnitude relative to said comparison voltage, means for applying said pulse signal to said generator to terminate said sweep, a beam stepping tube driver operative in response to said pulse signal to cause the beam of said beam stepping tube to advance to the next target position, means for reinitiating a sweep output from said generator a predetermined time after the generation of said pulse signal, and potentiometer means coupled to each target of the beam stepping tubes for controlling the comparison voltage output of the first-mentioned means for each position of the beam of the beam stepping tubes.

4. A sawtooth pulse pattern generator comprising a sawtooth sweep generator operative in response to an input triggering pulse to initiate a sawtooth sweep of preselected constant slope, means comprising a beam stepping tube for generating a comparison voltage, voltage comparison means coupled to the output of said generator and the first-mentioned means and serving to generate a pulse signal when the sweep output of said generator reaches a predetermined magnitude relative to said comparison voltage, means for applying said pulse signal to said generator to terminate said sweep, a beam stepping tube driver operative in response to said pulse signal to cause the beam of said beam stepping tube to advance to the next target position, means for reinitiating a sweep output from said generator a predetermined time after the generation of said pulse signal, and potentiometer means individual to each target of said beam stepping tube for independently controlling the comparison voltage output of the first-mentioned means for each position of the beam of said beam stepping tube.

5. A rectangular pulse pattern generator comprising a sawtooth sweep generator operative in response to an input triggering pulse to initiate a sweep, means including a beam stepping tube for generating a comparison voltage, voltage comparison means coupled to the output of said generator and the first-mentioned means and serving to generate a pulse signal when the sweep output of said generator reaches a predetermined magnitude relative to said comparison voltage, means for applying said pulse signal to said generator to terminate said sweep, a beam stepping tube drive operative in response to said pulse signal to cause the beam of said beam stepping tube to advance to the next target position, means for reinitiating a sweep output from said generator a predetermined time after the generation of said pulse signal, means coupled to each target of said beam stepping tube for controlling the comparison voltage output of the first-mentioned means for each position of the beam of said beam stepping tube, and additional means coupled to each target of said beam stepping tube and serving to provide an output voltage of any amplitude between zero and some predetermined maximum for each position of the beam of said beam stepping tube.

6. A rectangular pulse pattern generator comprising a sawtooth sweep generator operative in response to an input triggering pulse to initiate a sweep, means including a beam stepping tube for generating a comparison voltage, voltage comparison means coupled to the output of said generator and the first-mentioned means and serving to generate a pulse signal when the sweep output of said generator reaches a predetermined magnitude relative to said comparison voltage, means for applying said pulse signal to said generator to terminate said sweep, a beam stepping tube driver operative in response to said pulse signal to cause the beam of said beam stepping tube to advance to the next target position, means for reinitiating a sweep output from said generator a predetermined time after the generation of said pulse signal, potentiometer means coupled to each target of said beam stepping tube for independently controlling the comparison voltage output of the first-mentioned means for each position of the beam of said beam stepping tube, and second potentiometer means coupled to each target of said beam stepping tube in parallel with the first-mentioned potentiometer means, said second potentiometer means serving to provide an output voltage of any selected amplitude between zero and some predetermined maximum for each position of the beam of said beam stepping tube whereby a repetitive rectangular pulse pattern of any desired configuration can be achieved.

7. A rectangular pulse pattern generator comprising a sawtooth sweep generator operative in response to an input triggering pulse to initiate a sawtooth sweep of preselected constant slope, means including a beam stepping tube for generating a comparison voltage, voltage comparison means coupled to the output of said generator and the first-mentioned means and serving to generate a pulse signal when the sweep output of said generator reaches a voltage equal in magnitude to said comparison voltage, means for applying said pulse signal to said generator to terminate said sweep, a beam stepping tube driver operative in response to said pulse signal to cause the beam of said beam stepping tube to advance to the next target position, means for reinitiating a sweep output from said generator a predetermined time after the generation of said pulse signal, means including a potentiometer connected to each target of said beam stepping tube for independently controlling the comparison voltage output of the first-mentioned means for each position of the beam of said beam stepping tube, and means including a potentiometer connected to each target in parallel with the first-mentioned potentiometers for providing an output voltage of any selected magnitude between zero and some predetermined maximum for each position of the beam of said beam stepping tube, the second-mentioned potentiometers connected to alternate targets being adjusted so that the output of the last-recited means is zero when the beam of said beam stepping tube is incident upon said alternate targets.

8. The rectangular pulse generator as defined in claim 7 including means associated with the last-recited means for controlling the polarity of the output voltages derived from the last-recited means.

9. A sawtooth pulse pattern generator comprising a sawtooth sweep generator operative in response to an input triggering pulse to initiate a sweep, means including a beam stepping tube for generating a comparison voltage, voltage comparison means coupled to the output of said generator and the first-mentioned means and serving to generate a pulse signal when the sweep output of said generator reaches a predetermined magnitude relative to said comparison voltage, means for applying said pulse signal to said generator to terminate said sweep, a beam stepping tube driver operative in response to said pulse signal to cause the beam of said beam stepping tube to advance to the next target position, means for reinitiating a sweep output from said generator a predetermined time after the generation of said pulse signal, means coupled to each target of said beam stepping tube for controlling the comparison voltage output of the first-mentioned means for each position of the beam of said beam stepping tube, additional means coupled to each target of said beam stepping tube and serving to provide an output voltage of any amplitude between zero and some predetermined maximum for each position of the beam of said beam stepping tube, and integrating means responsive to the output of the last-recited means to produce a sawtooth pulse pattern wherein the slope of each sawtooth pulse is a function of the amplitude of the output voltage of said last-recited means producing it.

10. A sawtooth pulse pattern generator comprising a sawtooth sweep generator operative in response to an input triggering pulse to initiate a sweep, means including a beam stepping tube for generating a comparison voltage, voltage comparison means coupled to the output of said generator and the first-mentioned means and serving to generate a pulse signal when the sweep output of said generator reaches a predetermined magnitude relative to said comparison voltage, means for applying said pulse signal to said generator to terminate said sweep, a beam stepping tube driver operative in response to said pulse signal to cause the beam of said beam stepping tube to advance to the next target position, means for reinitiating a sweep output from said generator a predetermined time after the generation of said pulse signal, potentiometer means coupled to each target of said beam stepping tube for independently controlling the comparison voltage output of the first-mentioned means for each position of the beam of said beam stepping tube, second potentiometer means coupled to each target of said beam stepping tube in parallel with the first-mentioned potentiometer means, said second potentiometer means serving to provide an output voltage of any selected amplitude between zero and some predetermined maximum for each position of the beam of said beam stepping tube, and integrating means operative in response to the output of said second potentiometer means to produce a sawtooth pulse pattern wherein the slope of each sawtooth pulse is a function of the amplitude of the output voltage of said second potentiometer means producing it.

11. A sawtooth pulse pattern generator comprising a sawtooth sweep generator operative in responsive to an input triggering pulse to initiate a sawtooth sweep of preselected constant slope, means including a beam stepping tube for generating a comparison voltage, voltage comparison means coupled to the output of said generator and the first-mentioned means and serving to generate a pulse signal when the sweep output of said generator reaches a voltage equal in magnitude to said comparison voltage, means for applying said pulse signal to said generator to terminate said sweep, a beam stepping tube driver operative in response to said pulse signal to cause the beam of said beam stepping tube to advance to the next target position, means for reinitiating a sweep output from said generator a predetermined time after the generation of said pulse signal, means including a potentiometer connected to each target of said beam stepping tube for independently controlling the comparison voltage output of the first-mentioned means for each position of the beam of said beam stepping tube, means including a potentiometer connected to each target in parallel with the first-mentioned potentiometers for providing an output voltage of any selected magnitude between zero and some predetermined maximum for each position of the beam of said beam stepping tube, the second-mentioned potentiometers connected to alternate targets being adjusted so that the output of the last-recited means is zero when the beam of said beam stepping tube is incident upon said alternate targets, and integrating means responsive to the output of the last-recited means to produce a sawtooth pulse pattern wherein the slope of each sawtooth pulse is a function of the amplitude of the output voltage of said last recited means producing it.

References Cited in the file of this patent

UNITED STATES PATENTS

| | | |
|---|---|---|
| 2,448,069 | Ames et al. | Aug. 31, 1948 |
| 2,569,164 | Greenwood et al. | Sept. 25, 1951 |
| 2,604,590 | Wilson | July 22, 1952 |
| 2,662,197 | Comte | Dec. 8, 1953 |
| 2,854,575 | Richardson | Sept. 30, 1958 |